United States Patent [19]

Heisler et al.

[11] 3,996,859
[45] Dec. 14, 1976

[54] RAILWAY VEHICLE DIAPHRAGM FACE PLATE ASSEMBLY

[75] Inventors: William C. Heisler, Glenside; George W. Else, Warminster, both of Pa.

[73] Assignee: The Budd Company, Troy, Mich.

[22] Filed: Apr. 18, 1975

[21] Appl. No.: 569,255

[52] U.S. Cl. .................................. 105/15; 105/10; 105/21
[51] Int. Cl.² .................. B60D 5/00; B61D 17/14; B61D 17/22; B61D 49/00
[58] Field of Search ............. 105/8, 10, 15, 21

[56] References Cited
UNITED STATES PATENTS

| | | | |
|---|---|---|---|
| 2,354,045 | 7/1944 | Nystrom et al. | 105/15 |
| 3,399,632 | 9/1968 | Dean | 105/15 |
| 3,410,226 | 11/1968 | Krupp | 105/10 |
| 3,486,464 | 12/1969 | Dean et al. | 105/15 |

Primary Examiner—Robert J. Spar
Assistant Examiner—Howard Beltran

[57] ABSTRACT

Railway vehicle diaphragm having a body of elastomeric material removably secured to the end structure of a railway vehicle and a rigidifying face plate with wear liner removably secured to the outer end of the elastomeric body.

7 Claims, 3 Drawing Figures

RAILWAY VEHICLE DIAPHRAGM FACE PLATE ASSEMBLY

BACKGROUND

It has become a practice to use elastomeric sponge material in railway vehicle diaphragms to fully enclose the space between end passage openings of coupled vehicles or cars and support face plates which carry interengaging wear liners which are pressed together to form a complete seal throughout all the relative turning movements between vehicles in travel.

The diaphragm face plate liners are subject to constant rubbing contact and wear and the face plate assemblies sometimes become bent or distorted so that a complete seal against entry of air-borne dust, fumes, noise and the like cannot be maintained. The situation then often exists where only the face plate liner or face plate component is damaged while the major portion of the diaphragm unit remains in good serviceable condition. Nevertheless, it has been necessary to replace the entire diaphragm assembly in order to make the necessary restoration to serviceable condition.

U.S. Pat. No. 3,399,632, A. G. Dean, Sept. 3, 1968, shows a diaphragm installation of this general nature which is bolted to the end frame structure of a vehicle or car. In this construction and in all such similar prior proposed or applied constructions, so far as is known, the face plate sheet which carries the outer wear liner adhesively bonded thereto, is itself adhesively bonded to the outer end surface of the elastomeric sponge material. At the inner end surface the elastomeric sponge material body is adhesively bonded to an inner backing or supporting plate which is bolted to the end structure of the vehicle.

SYNOPSIS OF THE INVENTION

According to the present invention a permanent outer anchor plate is adhesively bonded to the outer surface of the elastomeric sponge material body and this anchor plate has enough added width to take fastening means for a face plate proper or sheet which carries the wear liner adhesively bonded thereto. The face plate sheet with its liner as a unit is removably secured to the anchor plate, as by set screws or bolts, generally referred to as bolting. The face plate is wider than the elastomeric body and anchor plate to enclose the attaching means and the outer end of the elastomeric body in its most compressed condition. The anchor plate is preferably made of a soft metal, such as aluminum, so it may be readily bent back to proper shape, if distorted, when the new face plate unit is installed. The face plate sheet itself is preferably made of a stronger material, such as stainless steel, and with rear side flanges for greater strength.

DRAWINGS

The objects of the invention, as well as various features of novelty and advantages, will be made apparent from the following description of an exemplary embodiment, reference being made to the accompanying drawings thereof, wherein.

SPECIFIC EMBODIMENT

Figure 1:
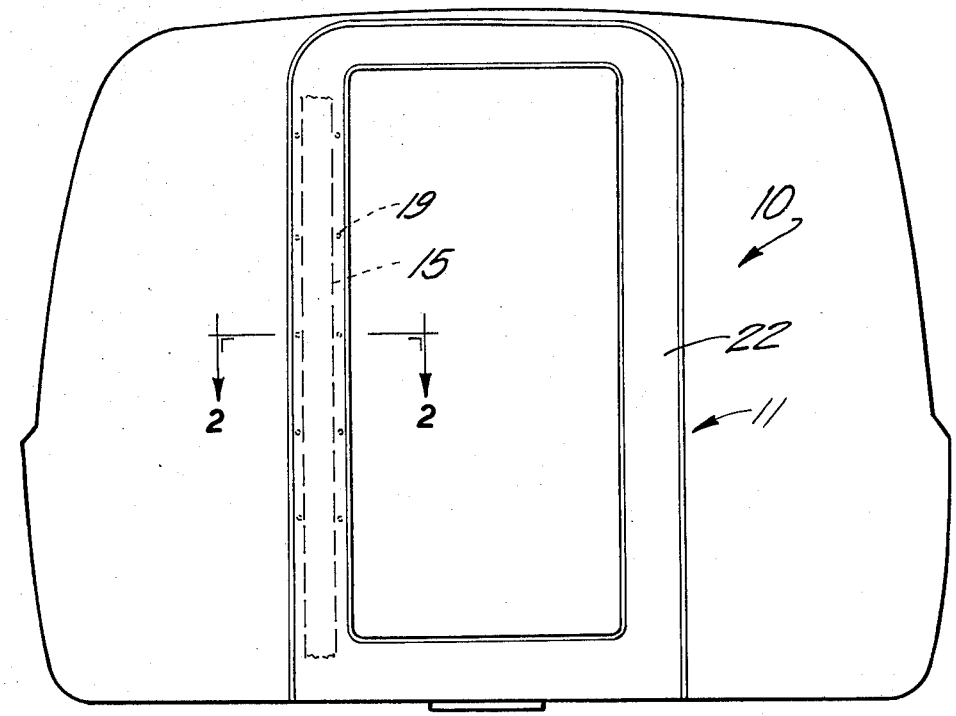
FIG. 1 is an end elevation of a vehicle diaphragm embodying the invention.

An inter-vehicle diaphragm is generally referred to in FIG. 1 by the numeral 10. It is sufficient for present purposes to note that this diaphragm forms a complete circumferential enclosure or ring around the end opening of the vehicle. It is made, handled and installed as a unit, as will be clear from the Dean patent referred to above. The main resilient cushion body of the diaphragm is composed of elastomeric sponge material, such for example, as flexible sponge polyurethane coated on the sides and non-bonding surfaces with a sealant, such as a 0.02 inch sprayed coating of polyvinyl, polyurethane or the like, one such being available as Dupont "Adiprene". At the bottom, again as disclosed in the Dean patent, there are weight-supporting shear elements of an elastomeric material which is stronger than foam but this does not require any special notice here, it being sufficient to know that the face plate unit 11 is a circumferentially complete body or ring carried on the outer end of the diaphragm assembly 10.

Figure 2:
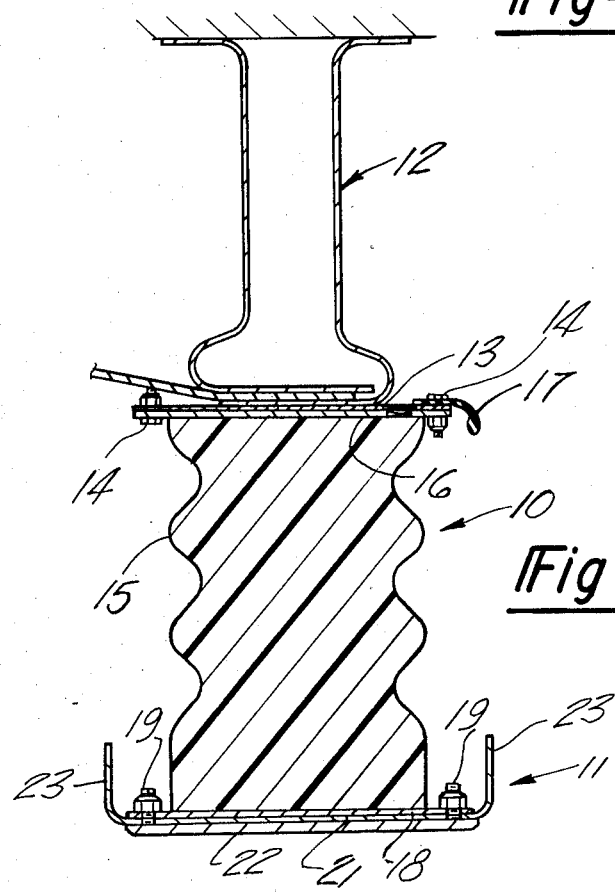
FIG. 2 is an enlarged horizontal section taken on the line 2—2 of FIG. 1.

FIG. 2 may be taken as a typical section on the sides where the collision posts 12 at each side of the end opening serve as base supports for the diaphragm. The outer portion of a collision post 12 comprises several overlapped layers of plate material, such as stainless steel, to which there is secured, as by welding, a fixed support plate 13 which is wider than the collision post and the diaphragm on one side and this support plate in the side extensions is provided with holes for attaching bolts 14.

The cushion portion of the diaphragm 10 is composed of an elastomeric sponge body 15 which is corrugated on the outer surface to promote uniform compression without buckling. At the longitudinally inner end of the elastomeric body there is secured permanently to it, as by adhesive boding, a base plate 16, as of aluminum. The base plate 16 has holes matching with those of support plate 13 for attaching bolts 14. At the laterally outer side a protective strip 17 is secured by the same bolts 14, the strip 17 having a forwardly curved portion terminating in a bulbous end.

At the longitudinally outer end of the elastomeric cushion body 15 there is permanently secured, as by adhesive bonding, an anchor plate 18, as of aluminum, having sides which extend beyond the sides of the elastomeric body, like plate 13, and which in the side extensions, like plate 13, is provided with holes for attaching bolts 19. Since the anchor plate 18 is formed of a soft metal it can be readily be restored to proper shape if it becomes bent or otherwise distorted in service.

A removable face plate unit or assembly, which was generally designated above by the numeral 11, comprises a face plate body sheet proper 21, as of a strong material such as stainless steel, and an outer wear liner 22 permanently secured to the face plate sheet, as by adhesive bonding. The face plate is wider than the anchor plate 18 and on the back is provided with welded-on stud bolts 19. Flash welding of the stud bolts with a jig to secure proper location is one means of securement. Beyond the stud bolt locations the sides of the face plate sheet are flanged rearwardly, as at 23, to protect and confine the elastomeric body, even when compressed to the maximum, and to provide increased strength.

Figure 3:
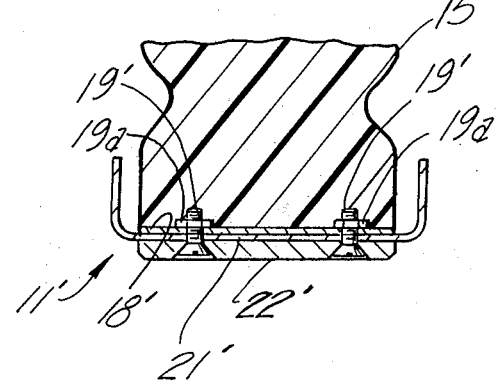
FIG. 3 is a view like FIG. 2 but showing a modified form.

The form shown in FIG. 3 differs from that of FIG. 2 in that means for attaching the face plate unit 11'. Here the anchor plate 18', adhesively bonded to the elastomeric body 15, is provided with holes for bolts 19' and nuts 19a secured to the anchor plate behind the holes. A plurality of recesses in the elastomeric body 15 is adapted to receive nuts and bolts therein. The lining 22' and face plate 21' are provided with holes for the bolts and the lining holes are countersunk for the heads of the bolts. The bolt heads are slotted or otherwise formed to take a turning tool, such as a screwdriver or the like.

The wear liner is preferably formed of a brake lining type of material having "Teflon" or other low-friction material incorporated therein, one such material being known as "Gatka".

Since the end opening of the vehicle is quite large it is inconvenient to form the circumferential plates in one piece, and they may be formed of separate sections welded together in planar disposition by known means, such as by heliarc welding.

By the disclosed arrangement, if the face plate lining becomes worn or if the face plate assembly becomes bent or otherwise distorted, it is a simple and relatively inexpensive operation to unbolt and remove the face plate unit, restore the anchor plate to correct shape, if needed, and install a new face plate unit. The remainder of the diaphragm unit has a much longer expected life and much trouble and expense are saved in keeping it in service by merely replacing the face plate unit instead of the whole diaphragm assembly, as formerly necessary. Besides, the additional face plate sheet, especially with side flanges, gives added strength to reduce the liklihood of distortion in use. While one embodiment of the invention has been described for purposes of illustration, it is to be understood that there may be various embodiments and modifications within the general scope of the invention.

We claim:

1. A railway vehicle diaphragm, comprising in combination, an elastomeric cushion body secured around an end opening of a vehicle, an anchor plate adhesively bonded to the longitudinal outer end of said cushion body, and a face plate unit removably secured to said anchor plate, said anchor plate and said removable face plate unit being wider than the elastomeric cushion body and being secured together outside the width of said elastomeric cushion body.

2. A railway vehicle diaphragm as set forth in claim 1, further characterized by the fact that said face plate unit includes a metal face plate body sheet proper and a wear liner adhesively bonded to the outer surface of said face plate body sheet.

3. A railway vehicle diaphragm as set forth in claim 1, further characterized by the fact that said removable face plate unit includes a body sheet with a flange spaced at a distance from the side of the elastomeric cushion body.

4. A railway vehicle diaphragm as set forth in claim 1, further characterized by the fact that said anchor plate is formed of a soft metal and said face plate unit includes a sheet of a stronger, harder metal.

5. A railway vehicle diaphragm as set forth in claim 1, further characterized by the fact that said face plate unit includes a sheet with stud bolts secured on its rear surface.

6. A railway vehicle diaphragm as set forth in claim 1, further characterized by the fact that said anchor plate has nuts secured behind bolt holes therein and that said face plate unit has countersunk holes for the heads of securing bolts engaged in said nuts.

7. A railway vehicle diaphragm, comprising in combination, an elastomeric cushion body secured around an end opening of a vehicle and having plurality of recesses adapted to receive nuts and bolts therein, an anchor plate adhesively bonded to a longitudinal outer end of said elastomeric cushion body, said anchor plate having a plurality of bolt holes disposed in alignment with said plurality of recesses, a plurality of nuts disposed within said recesses of said elastomeric body and adjacent said bolt holes to receive a plurality of securing bolts, said anchor plate being adhesively bonded to the longitudinal outer end of said cushion body, a face plate having a plurality of openings removably secured to said anchor plate, and means including a plurality of securing bolts connected to said plurality of nuts for securing said face plate unit to said anchor plate.

* * * * *